United States Patent
Agrawal et al.

(10) Patent No.: US 8,554,789 B2
(45) Date of Patent: Oct. 8, 2013

(54) MANAGING CYCLIC CONSTRUCTS OF XML SCHEMA IN A RDBMS

(75) Inventors: Abhyudaya Agrawal, San Francisco, CA (US); Ravi Murthy, Fremont, CA (US); Nipun Agarwal, Santa Clara, CA (US); Sivasankaran Chandrasekar, Palo Alto, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1669 days.

(21) Appl. No.: 11/246,001

(22) Filed: Oct. 7, 2005

(65) Prior Publication Data

US 2007/0083529 A1    Apr. 12, 2007

(51) Int. Cl.
*G06F 17/30*    (2006.01)
*G06F 12/00*    (2006.01)

(52) U.S. Cl.
USPC .......................................... 707/778; 707/829

(58) Field of Classification Search
USPC ........... 707/100, 3, 4, 102, 778, 829; 715/239
See application file for complete search history.

(56) References Cited

U.S. PATENT DOCUMENTS

| | | | |
|---|---|---|---|
| 5,295,261 A | 3/1994 | Simmonetti | |
| 5,404,513 A | 4/1995 | Powers et al. | |
| 5,467,471 A | 11/1995 | Bader | |
| 5,680,614 A | 10/1997 | Bakuya et al. | |
| 5,724,577 A | 3/1998 | Exley et al. | |
| 5,734,887 A | 3/1998 | Kingberg et al. | |
| 5,878,415 A | 3/1999 | Olds | |
| 5,974,407 A | 10/1999 | Sacks | |
| 5,987,506 A | 11/1999 | Carter et al. | |
| 5,999,941 A | 12/1999 | Andersen | |
| 6,012,067 A | 1/2000 | Sarkar | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,199,195 B1 | 3/2001 | Goodwin et al. | |
| 6,208,993 B1 | 3/2001 | Shadmone | |
| 6,236,988 B1 | 5/2001 | Aldred | |

(Continued)

FOREIGN PATENT DOCUMENTS

EP    1 241 589 A2    9/2002
WO    WO 00/49533    8/2000

(Continued)

OTHER PUBLICATIONS

Chen, Ruey-Shun et al., "Developing an XML framework for metadata system", Trinity College Dublin, Proc. of the 1st Inter. Sympo. on Information and Communication, pp. 267-272.

(Continued)

*Primary Examiner* — Jacob F Bétit
*Assistant Examiner* — Bao Tran
(74) *Attorney, Agent, or Firm* — Hickman Palermo Truong Becker Bingham Wong LLP (57) ABSTRACT

A database system automatically detects a cyclic construct in a XML schema, determines a database representation for the cyclic construct, and maps the XML schema and elements involved in the cyclic construct to the database representation.

18 Claims, 5 Drawing Sheets

(56) References Cited

U.S. PATENT DOCUMENTS

| | | | |
|---|---|---|---|
| 6,240,407 B1 | 5/2001 | Chang et al. | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1 | 7/2002 | Sarkar | |
| 6,438,540 B2 | 8/2002 | Nasr et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,571,231 B2 | 5/2003 | Sedlar | |
| 6,574,655 B1 | 6/2003 | Libert et al. | |
| 6,584,459 B1 | 6/2003 | Chang et al. | |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,718,322 B1 | 4/2004 | Brye | |
| 6,721,727 B2 | 4/2004 | Chau et al. | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,826,727 B1 | 11/2004 | Mohr et al. | |
| 6,826,857 B1 | 12/2004 | Ten-Hove et al. | |
| 6,836,778 B2 | 12/2004 | Manikutty et al. | |
| 6,871,204 B2 | 3/2005 | Krishnaprasad et al. | |
| 7,031,956 B1 | 4/2006 | Lee et al. | |
| 7,437,374 B2* | 10/2008 | Chen et al. | 1/1 |
| 7,890,479 B2* | 2/2011 | Chen et al. | 707/701 |
| 7,912,871 B2* | 3/2011 | Shmueli et al. | 707/803 |
| 2002/0015042 A1 | 2/2002 | Robotham et al. | |
| 2002/0035606 A1 | 3/2002 | Kenton | |
| 2002/0038358 A1 | 3/2002 | Sweatt, III et al. | |
| 2002/0056025 A1 | 5/2002 | Qiu et al. | |
| 2002/0073019 A1 | 6/2002 | Deaton | |
| 2002/0087510 A1 | 7/2002 | Weinberg et al. | |
| 2002/0116371 A1 | 8/2002 | Dodds et al. | |
| 2002/0116457 A1 | 8/2002 | Eshleman et al. | |
| 2002/0120685 A1 | 8/2002 | Srivastava et al. | |
| 2002/0123993 A1 | 9/2002 | Chau et al. | |
| 2002/0124100 A1 | 9/2002 | Adams | |
| 2002/0133484 A1 | 9/2002 | Chau et al. | |
| 2002/0143512 A1 | 10/2002 | Shamoto et al. | |
| 2002/0156772 A1 | 10/2002 | Chau et al. | |
| 2002/0156811 A1 | 10/2002 | Krupa | |
| 2002/0169788 A1 | 11/2002 | Lee et al. | |
| 2002/0184188 A1 | 12/2002 | Mandyam et al. | |
| 2002/0184401 A1 | 12/2002 | Kadel, Jr. et al. | |
| 2002/0198874 A1 | 12/2002 | Nasr et al. | |
| 2003/0004937 A1 | 1/2003 | Salmenkaita et al. | |
| 2003/0009361 A1 | 1/2003 | Hancock et al. | |
| 2003/0014397 A1 | 1/2003 | Chau et al. | |
| 2003/0033285 A1 | 2/2003 | Jalali et al. | |
| 2003/0065659 A1 | 4/2003 | Agarwal et al. | |
| 2003/0070144 A1 | 4/2003 | Schnelle et al. | |
| 2003/0093672 A1 | 5/2003 | Cichowlas | |
| 2003/0101194 A1 | 5/2003 | Rys et al. | |
| 2003/0140308 A1* | 7/2003 | Murthy et al. | 715/500 |
| 2003/0154204 A1 | 8/2003 | Chen-Wright et al. | |
| 2003/0158897 A1 | 8/2003 | Ben-Natan et al. | |
| 2003/0182624 A1 | 9/2003 | Large | |
| 2004/0043758 A1 | 3/2004 | Sorvari et al. | |
| 2004/0060003 A1 | 3/2004 | Mani et al. | |
| 2004/0064466 A1 | 4/2004 | Manikutty et al. | |
| 2004/0148278 A1 | 7/2004 | Milo et al. | |
| 2004/0176958 A1 | 9/2004 | Salmenkaita et al. | |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2004/0267760 A1 | 12/2004 | Brundage et al. | |
| 2005/0010896 A1 | 1/2005 | Meliksetian et al. | |
| 2005/0050058 A1 | 3/2005 | Jain et al. | |
| 2005/0050092 A1 | 3/2005 | Jain et al. | |
| 2005/0289125 A1 | 12/2005 | Liu et al. | |
| 2006/0031233 A1 | 2/2006 | Liu et al. | |
| 2008/0235251 A1* | 9/2008 | Shmueli et al. | 707/100 |
| 2008/0313234 A1* | 12/2008 | Chen et al. | 707/104.1 |

FOREIGN PATENT DOCUMENTS

| | | |
|---|---|---|
| WO | WO 01/42881 A2 | 6/2001 |
| WO | WO 01/59602 A1 | 8/2001 |
| WO | WO 01/61566 A1 | 8/2001 |

OTHER PUBLICATIONS

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Josephine Cheng, et al., "IBM DB2 XML Extender, An end-to-end solution for storing and retrieving XML documents.," IEEE, ICDE '00 Conference, San Diego, Feb. 2000, 128 pages.

R. Bourret et al.: A Generic Load/Extract Utility for Data Transfer Between XML Documnts and Relational Databases, Jun. 8-9, 2000, IEEE Computing Soc., pp. 134-143.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

International Preliminary Examination Report, Application No. PCT/US02/30783, pp. 1-14.

J. Shanmugasundaram, et al. "Querying XML Views of Relational Data," Proceedings of the 27$^{th}$ Very Large Databases Conference, Rome, Italy, Sep. 2001, pp. 261-270.

Current claims in PCT/US02/30783, pp. 1-8.

Albrecht Schmidt et al., "Efficient Relational Storage and Retrieval of XML Documents," CWI, The Netherlands (pp. 1-6).

Sandeepan Banerjee, Oracle Corporation, "Oracle 9i 'Project XDB'—The XML Database," Oracle—2001, (pp. 1-18).

Sandeepan Banerjee, et al., "Oracle8i—The XML Enabled Data Management System," Oracle Corporation, Mar. 2000 IEEE pp. 561-568.

Ramon Lawrence et al., "Integrating Relational Database Schemas Using a Standardized Dictionary," 2001, ACM (pp. 225-230).

Latifur Khan et al., "A Performance Evaluation of Storing XML Data in Relational Database Management Systems," ACM—2001 (pp. 31-38).

Philip Bohannon, et al., "From XML Schema to Relations: A Cost-Based Approach to XML Storage," Bell Laboratories, IEEE, 2002, Proceedings of the 18th International Conference on Data Engineering (ICDE'02), 12 pages.

Raghu Ramakrishnan, et al., "SRQL: Sorted Relational Query Language," Jul. 1-3, 1998, IEEE pp. 84-95.

Daniela Florescu et al., "A Performance Evaluation of Alternative Mapping Schemes for Storing XML Data in a Relational Database," May 1999, XP-002168318, pp. 1-31.

International Preliminary Examination Report, Application No. PCT/US03/35551, pp. 1-17.

(56) References Cited

OTHER PUBLICATIONS

Written Opinion, Application No. PCT/US03/35551.
Current claims in PCT/US03/35551, pp. 1-4.
Melton, John, "ISO-ANSI Working Draft, XML-Related Specifications (SQL/XML)," WG3: DRS-020, H2-2002-365, Aug. 2002, 154 pages.
Oracle Corporation, "Oracle9i XML Database Developer's Guide—Oracle XML DB," Release 2 (9.2), Mar. 2002, Part No. A96620-1, pp. 4-31-4-35, 5-21-5-24 and 5-70-5-71.
W3C, "XML Schema Part 1: Structures," W3C Recommendation, May 2, 2001, <http://www.w3.org/TR/2001/REC-xmlschema-1-20010502/>, pp. 1-203.
W3C, "XML Schema Part 2: Datatypes," W3C Recommendation, May 2, 2001, <http://www.w3.org/TR/2001/REC-xmlschema-2-20010502/>, pp. 1-146.
Ming-Ling Lo et al., "XAS: A System for Accessing Componentized, Virtual XML Documents," IEEE, 2001, pp. 493-502.
Andrea Zisman et al., "Using XML to Build Consistency Rules for Distributed Specifications," Proceedings of the Tenth International Workshop on Software Specification and Design (IWSD'00), IEEE 2000, 8 pages.
Jussi Myllymaki, "Effective Web Data Extraction with Standard XML Technologies," WWW10, May 1-5, 2001, pp. 689-696.
Albrecht Schmidt et al., "Why and How to Benchmark XML Databases," SIGMOND Record, vol. 3, No. 3, Sep. 2001, pp. 27-32.
Japanese Patent Office, "Notice of Grounds of Rejection", Patent application No. 533163/2003, mailed Aug. 19, 2008 / 7 pages.
Claims, Patent application No. 533163/2003, 9 pages.
Tomoharu, Asami, "Development of Database System by XML, Relaxer, and JDBC", partial English translation, XML Press, Gijutsu-Hyohron Co., Jul. 10, 2001, vol. 3, 2 pages.
Makoto, Onizuka, "XML and Database", partial English translation, XML Magazine, Shoeisha Co., Ltd., Jul. 1, 2000, vol. 10, No. 3, 1 page.
Hironobu, Koyaku, "What is brought to SQL Server 2000 by XML?", partial English translation, Enterprise Servers, IDG Japan, Dec. 1, 2000, vol. 3, No. 12, 1 page.

* cited by examiner

MANAGING CYCLIC CONSTRUCTS OF XML SCHEMA IN A RDBMS

RELATED APPLICATIONS

This application is related to U.S. patent application Ser. No. 10/428,878, entitled Techniques For Rewriting XML Queries Directed To Relational Database Constructs, filed by Anand Manikutty, et al. on May 1, 2003, referred to hereafter as the "Rewrite Application", the contents of which are incorporated herein by reference as if originally set forth herein.

This application is related to U.S. patent application Ser. No. 10/259,278, filed on Sep. 27, 2002, entitled Mechanism For Mapping Xml Schemas To Object-Relational Database Systems, by Ravi Murthy, et al., the contents of which are incorporated herein by reference as if originally set forth herein.

FIELD OF THE INVENTION

The present invention relates to storing XML data in a database, and in particular, to storing XML schemas instances that contain cyclic constructs.

BACKGROUND

The Extensible Markup Language (XML) is the standard for data and documents that is finding wide acceptance in the computer industry. XML describes and provides structure to a body of data, such as a file or data packet, referred to herein as a XML entity. The XML standard provides for tags that delimit sections of a XML entity referred to as XML elements. Each XML element may contain one or more name-value pairs referred to as attributes. The following XML Segment A is provided to illustrate XML.

Segment A

```
<book>My book
    <publication publisher="Doubleday"
        date="January"></publication>
    <Author>Mark Berry</Author>
    <Author>Jane Murray</Author>
</book>
```

XML elements are delimited by a start tag and a corresponding end tag. For example, segment A contains the start tag <Author> and the end tag </Author> to delimit an element. The data between the elements is referred to as the element's content. In the case of this element, the content of the element is the text data Mark Berry.

Element content may contain various other types of data, which include attributes and other elements. The book element is an example of an element that contains one or more elements. Specifically, book contains two elements: publication and author. An element that is contained by another element is referred to as a descendant of that element. Thus, elements publication and author are descendants of element book. An element's attributes are also referred to as being contained by the element.

By defining an element that contains attributes and descendant elements, the XML entity defines a hierarchical tree relationship between the element, its descendant elements, and its attribute. A root node and a set of elements that descend from the root node are referred to herein as a XML document.

XML Data Models

An important standard for XML is the XQuery 1.0 and XPath 2.0 Data Model. (see W3C Working Draft, 29 Oct. 2004), which is incorporated herein by reference and referred to hereinafter as the XQuery Data Model.

One aspect of the XQuery Data Model is that XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents a XML document, a node can correspond to an element, the child nodes of the node correspond to an attribute or another element contained in the element. The node may be associated with a name and value. For example, for a node tree representing the element book, the name of the node associated with element book is book, and the value is 'My book'. For a node representing the attribute publisher, the name of the node is publisher and the value of the node is 'Doubleday'.

For convenience of expression, elements and other parts of a XML document are referred to as nodes within a tree of nodes that represents the document. Thus, referring to 'My book' as the value of the node with name book is just a convenient way of expressing the value of the element associated with node book is My book.

XML Schemas

Information about the structure of specific types of XML documents may be specified in documents referred to as "XML schemas". For example, the XML schema for a particular type of XML document may specify element definitions and type definitions. XML documents that conform to a XML schema are referred to herein as XML schema instances. Standards governing XML schemas include XML Schema, Part 0, Part 1, Part 2, W3C Recommendation, 2 May 2001, the contents of which are incorporated herein by reference, XML Schema Part 1: Structures, Second Edition, W3C Recommendation 28 Oct. 2004, the contents of which are incorporated herein by reference, and XML Schema Part 2: Datatypes Second Edition, W3C Recommendation 28 Oct. 2004, the contents of which incorporated herein by reference.

XML Storage Mechanisms

Various types of storage mechanisms are used to store a XML document. One type of storage mechanism stores a XML document as a text file in a file system.

Another type of storage mechanism uses object-relational database systems that are enhanced to store and process queries for collections of XML documents. Furthermore, these object-relational database systems can store and manage XML documents as XML schemas instances. To store and manage the XML documents in a database system, database representations, defined in terms of data types handled by the database system (referred to herein as database types) are used to represent XML documents. Database types include, for example, native database types, such as integer and VARCHAR ("variable length character string"), or object types defined for a database system using a DDL statements (data definition language statements)

For example, a database representation of an entire XML document may be a CLOB (binary large object), or maybe one or more tables whose columns store an element of XML documents. A database representation may be a hierarchy of objects in an object-relational database; each object is an instance of an object class and stores one or more elements of a XML document. The object class defines, for example, the structure corresponding to an element, and includes references or pointers to objects representing the immediate descendants of the element.

Cyclic Constructs

XML Schema allows cyclic constructs, which are very convenient for modeling naturally-occurring cyclic structures. For example, it can be useful to define a list that contains data and additional lists, each of which can also contains data and lists, and so one. The following XML schema L defines such a cyclic construct.

```
<element name="List">
  <complexType>
    <sequence>
      <element name="Data" type="string"/>
      <element ref="List" minOccurs="0"/>
    </sequence>
  </complexType>
</element>
```

The XML schema L defines an element List that contains another element List which has the same definition. Elements are defined by the same definition when they are defined, at least in part, by the same element declaration. In XML Schema, this can occur through the use of the 'ref' attribute within the declaration of an element. The declaration <element ref="List" minOccurs="0"/> contains an attribute ref that refers to the first element declaration for List, i.e. the declaration beginning with <element name="List">. The first element declaration for List contains the declaration for List that refers to the first element declaration for List.

This form of cyclic construct is referred to as inclusion. Inclusion occurs when an element's declaration INCLUDES another element that has the same definition, or when the declaration of a type INCLUDES an element of that type. In either case, these elements are referred to herein as a cyclic element; a declaration that defines a cyclic element is referred to as a cyclic element declaration. For example, the declaration that begins with <element name="List"> and the declaration <element ref="List" minOccurs="0"/> are cyclic declarations. A cyclic element contained by a cyclic element is referred to as a contained cyclic element.

As shown above, a cyclic construct defines an element that can have an unbounded number of hierarchical levels in a XML schema instance. For example, a XML schema instance of XML schema L can have any number of levels within the element LIST. An element LIST can contain another element LIST, which can contain another element LIST, and so forth. Thus, the number of hierarchal levels in List is unbounded.

Manual Mapping of Cyclic Constructs

Often, the elements defined by a XML schema are each mapped to a separate column of an object-relational table. However, such mapping is not feasible for a XML schema with cyclic constructs. The structure of the object-relational table has to have a fixed size, e.g. a fixed number of columns. The number of levels of a cyclic element in a XML instance of a cyclic construct is however unbounded.

To overcome this problem, human developers manually review a XML schema to search for a cyclic construct in a XML schema, and when they spot one, specify within the XML schema a database representation that can handle the cyclic constructs. Such database representations may be manually specified by including annotations within a XML schema that specify the database representation. The annotation may be in the form of, for example "annotation attributes" included in the elements of a XML schema. The annotation attributes may belong to a namespace, such as XDB, and specify one or more properties of the database representation.

Spotting cyclic constructs and annotating database representations within a XML schema is error prone and tedious. Clearly, there is a need for improved approaches for handling cyclic constructs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in the BACKGROUND section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a mechanism for automatically managing cyclic constructs. According to embodiment of the present invention, a database system automatically detects a cyclic construct in a XML schema, determines a database representation for the cyclic construct, and maps the XML schema and elements involved in the cyclic construct to the database representation. Thus, the database system is able automatically handle a construct that is very useful and convenient for modeling naturally-occurring cyclic structures.

System Overview

Figure 1:
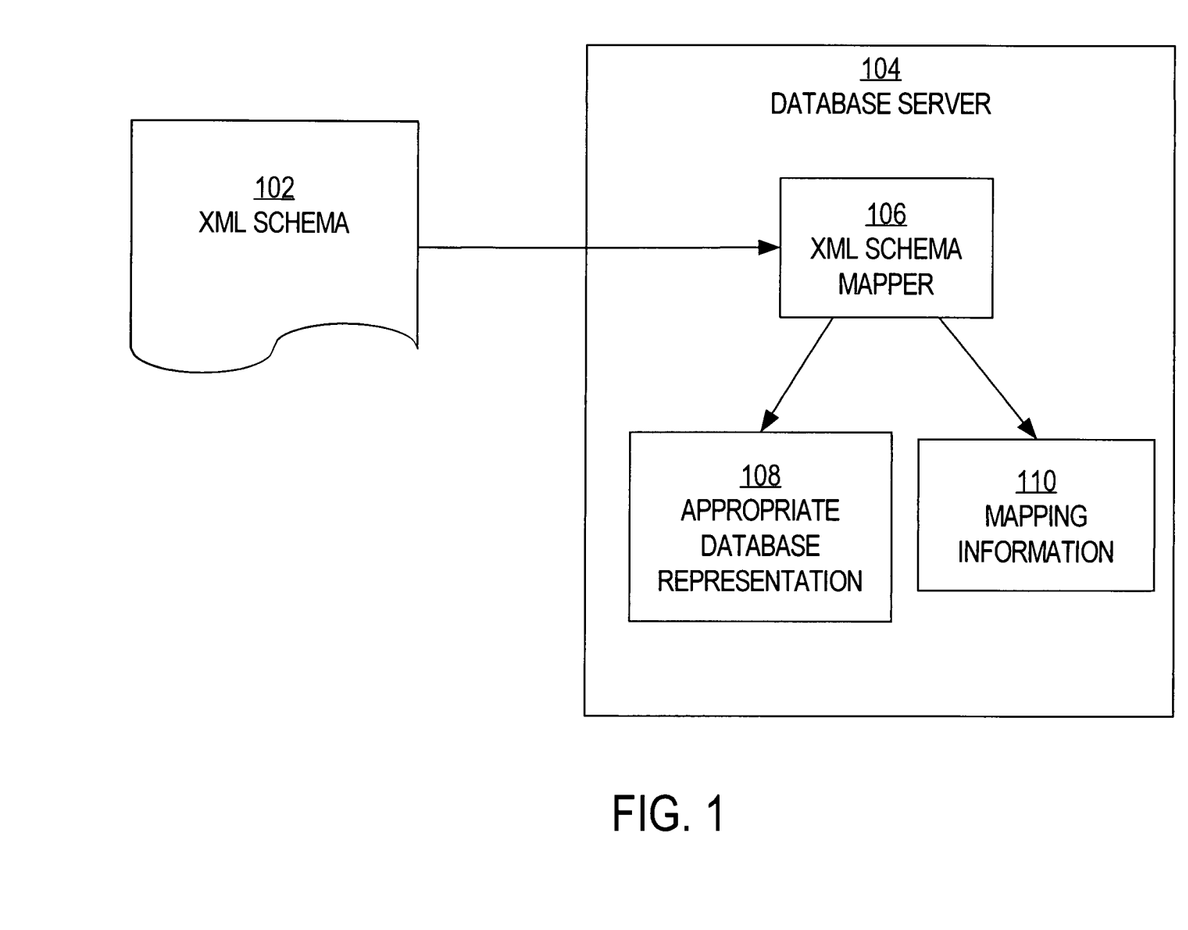
FIG. 1 is a block diagram of a storage mechanism for storing XML data according to an embodiment of the present invention.

FIG. 1 is a block diagram of an object-relational database system that includes a mechanism for mapping XML schemas to database representations of the object-relational database system. The system includes a database server 104. A server, such as database server 104, is a combination of integrated software components and an allocation of computational resources, such as memory, one or more computers, and processes on the one or more computers that execute the integrated software components on a processor, the combination of the software and computational resources being dedicated to performing a particular function on behalf of one or more clients. A database server governs and facilitates access to a particular database, processing requests by clients to access the database.

Database server 104 includes a XML schema mapper 106. When a XML schema 102 is registered with database server 104, XML schema mapper 106 determines the appropriate database representation 108 for documents that conform to XML schema 102, and generates mapping information 110 that indicates the correlation between the constructs declared by the XML schema and the elements of the database representation 108.

According to an embodiment, a XML schema has to be first registered with database server 104 before it can be used or referenced within database server 104. After the registration process is completed, XML documents conforming to this XML schema (and referencing it via the schema URL within the document) can be stored and treated by database server 104 as instances of the XML schema.

Database Representations for Cyclic Constructs

According to an embodiment of the present invention, to handle cyclic constructs, contained circular elements of a XML schema are mapped to an out-of-line table. An out-of-line table is a table different than one to which an ascendant element of a contained circular element is mapped. An out-of-line table and its use for mapping contained cyclic elements is illustrated with reference to XML schema L, and the following data definition language statements.

The below DDL statement creates an object type to represent the List elements defined by XML schema L.

CREATE TYPE LIST_TYPE AS OBJECT (DATA VARCHAR2(4000), LIST REF XMLTYPE)

The DDL statement defines an object type LIST_TYPE. LIST_TYPE includes two attributes: DATA, which holds data for the DATA element of LIST; LIST, a reference to XMLType object for holding descendant LIST elements. XMLType is a native type supported by database servers, such as Oracle 10g, and is used to represent XML data.

The below DDL statement creates a table to hold objects of the type LIST_TYPE.

CREATE TABLE LIST_TAB OF XMLTYPE TYPE LIST_TYPE

In response to receiving the DDL statement, the database server creates a XMLType table named LIST_TYPE that holds LIST_TYPE objects. In an embodiment, the attribute REF in object type LIST_TYPE may be constrained to only point to objects in the LIST_TYPE table.

For a particular XML schema instance, any LIST element that descends from another LIST element is stored out-of-line in the out-of-line table LIST_TYPE. The object representing the containing parent List element has a reference to the object in out-of-line table LIST_TYPE that represents the descendant LIST element. Such a descendant element may have a child LIST element. The object for the descendant element contains a reference to the object in out-of-line table LIST_TYPE that holds the child LIST element. Thus, any descendant LIST element in an instance of XML schema L is stored out-of-line in table LIST_TYPE.

To effect the mapping to the out-of-line table LIST_TYPE, annotations are added to the cyclic declaration for the contained cyclic element LIST, as follows.

```
<element name="List">
  <complexType>
    <sequence>
      <element name="Data" type="string"/>
      <element ref="List" minOccurs="0" xdb:SQLInline="false"
          xdb:defaultTable="LIST_TAB"/>
    </sequence>
  </complexType>
</element>
```

The annotation attribute xdb:SQLInline="false" specifies that the descendant element LIST is to be stored out-of-line. The annotation attribute xdb:defaultTable="LIST_TAB" specifies that the out-of-line table is LIST_TYPE.

Automatically Detecting Cyclic Constructs

Figure 2:
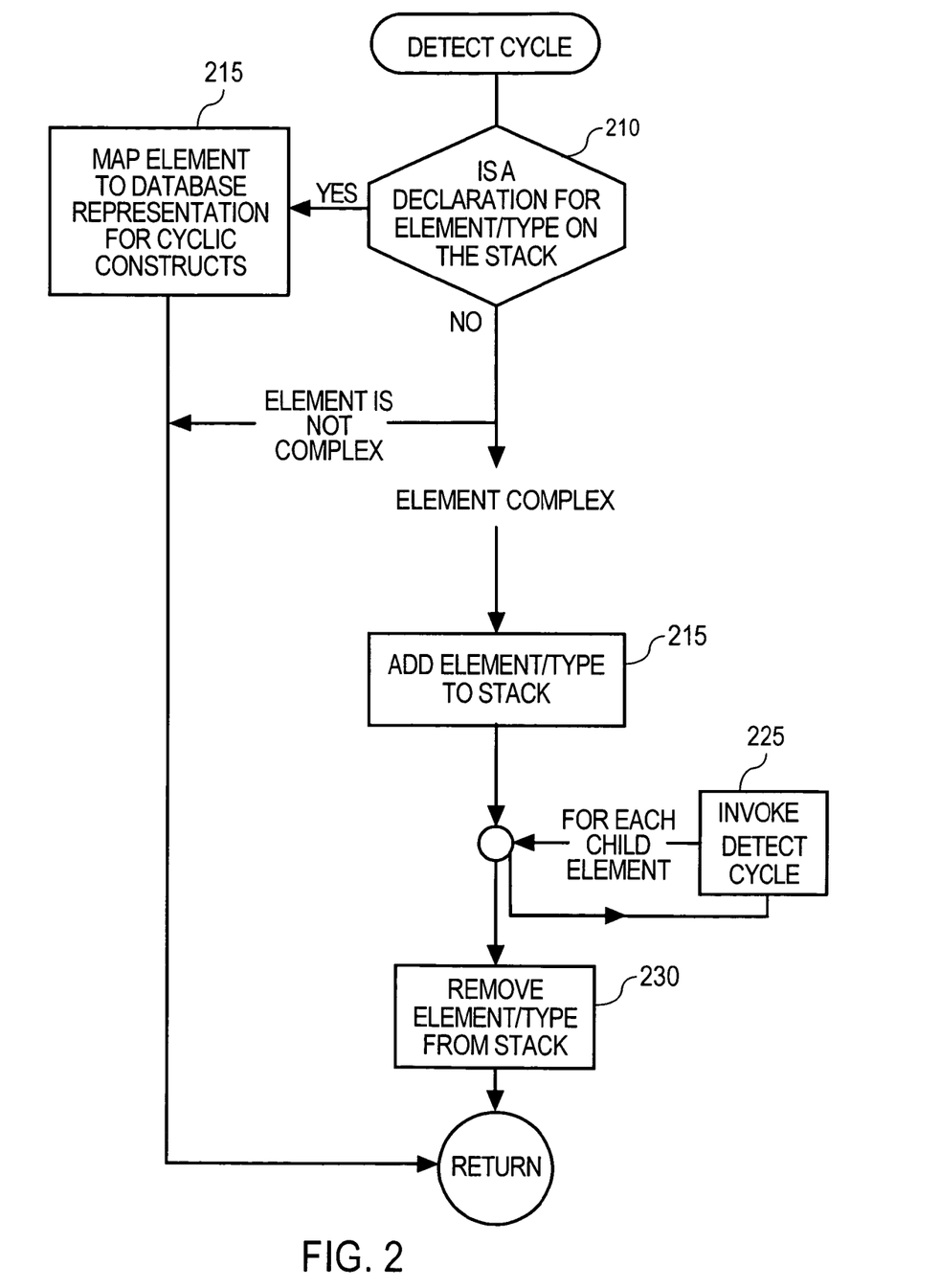
FIG. 2 is a flow chart of a procedure for automatically detecting and mapping cyclic constructs of a XML schema according to an embodiment of the present invention.

FIG. 2 shows a procedure DETECT CYCLE for detecting cyclic constructs according to an embodiment of the present invention. The procedure operates recursively, traversing the declaration of either an element or type in a XML schema and the declaration of child elements therein, and for each of these, the declaration of their children elements. The procedure uses a stack to track the declaration of elements or types encountered during the traversal. When during the traversal of an element or type declaration, that element or type declaration is found on the stack, a cyclic contained element declaration is established as being found. The encountered element is mapped to a database representation for handling cyclic constructs.

Referring to FIG. 1, at step 210, it is determined whether the "current declaration" declares a type, element, or element of a type that is on the stack. The term stack refers to a list in which, at least logically, the entry most recently added is the first entry removed.

If the element or its type is listed on the stack, then a cyclic construct has been detected. At step 215, the element is mapped to a database representation for cyclic constructs. According to an embodiment, the element is mapped for out-of-line storage as discussed previously. However, the present invention it not so limited.

On the other hand, if the element or its type is listed on the stack, execution flows to step 215, unless the current element is not complex, in which case execution of current invocation of DETECT CYCLE ends.

At step 215, the element or type declared by the current declaration is added to the stack. Next, for each declaration of a child element, the procedure DETECT CYCLE is recursively invoked at step 225.

At step 230, the element or complex type declared by the current declaration is removed from the stack.

DETECT CYCLE is now illustrated with reference to XML schema L. The procedure DETECT CYCLE is invoked. In this first level of traversal, the first declaration of element LIST is encountered. It is determined that the element LIST is not on the stack (210). Since LIST is complex, it is added to the stack (215). Next, each of the child elements DATA and LIST are traversed in a second level of traversal, by invoking DETECT CYCLES.

In a second level of traversal for element DATA, it is determined that neither DATA or its declared type string is on the stack (210). Because DATA is not complex, the invocation for DATA ceases.

For element LIST, it is determined that a declaration for LIST is already on the stack (210). Thus, this element is mapped to out-of-line storage at step 215.

Inheritance

Cycles not only occur solely as a result of inclusion but also as a result of type inheritance and substitution. Substitution refers to the ability to, within an instance of a XML schema, substitute an element of a particular type with an element of a subtype of the particular type (e.g. via the schema construct xsi:type). XML schema instances with such substitution are compliant with the XML schema.

When determining a database representation of an element of a base type, the possibility of having to store an element of a subtype is considered and accounted for. The database representation to which the element is mapped should have constructs that handle the base type and any of its subtypes. This requires that an element declared as a type should be treated and analyzed as if it could be any of its subtypes for purposes of detecting cyclic constructs.

The handling of such cyclic constructs is illustrated with reference to XML schema A.

| XML Schema A |
|---|
| <element name="A" type="A1type"/> |
| <complexType name="A1Type"> |
| <complexContent> |
| <extension base="A0Type"> |
| <sequence> |
|    <element name="A0" type="A0Type"/> |
|    <element name="Data" type="string"/> |
|    <element name="A3" type="A3Type"/> |
| </sequence> |
| </extension> |
| </complexType> |
| <complexType name="A0Type"> |
| <sequence> |
|    <element name="Data1" type="string"/> |
| </sequence> |
| </complexType> |
| <complexType name="A3Type"> |
| <complexContent> |
| <extension base="A1Type"> |
| <sequence> |
|    <element name="Data2" type="string"/> |
| </sequence> |
| </extension> |
| </complexContent> |
| </complexType> |
| </element> |

Figure 3:
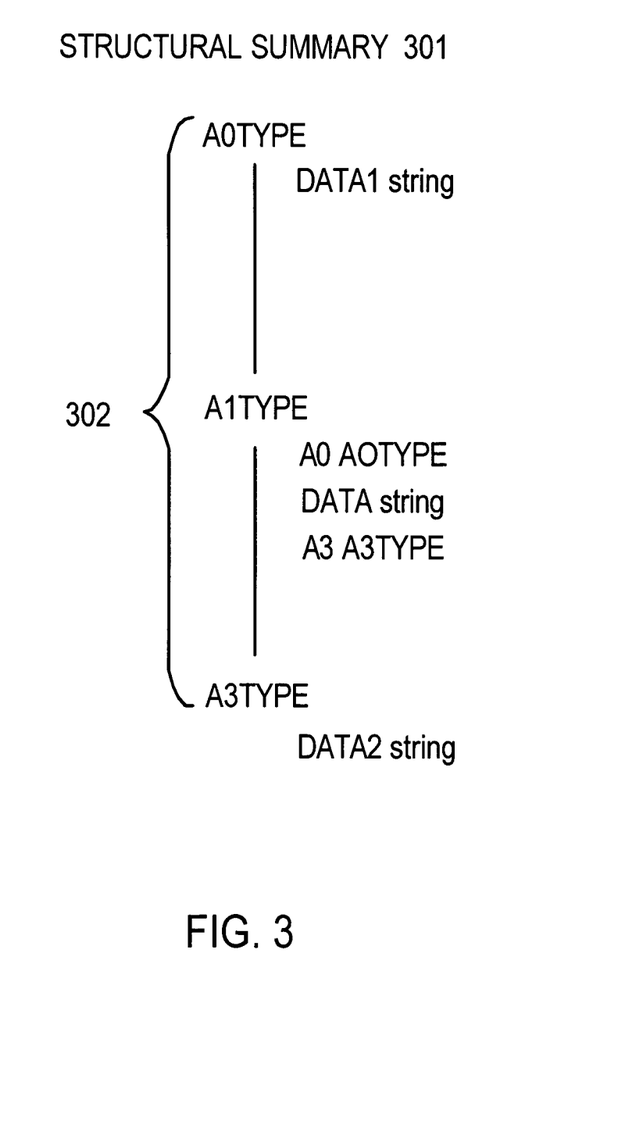
FIG. 3 is a structural summary of a type defined by a XML schema according to an embodiment of the present invention.

The structures of XML schema A are depicted by structural summary 301 in FIG. 3. Structural summary 301 shows the inheritance hierarchy between types declared in XML schema A and the elements that each of the types contain.

Referring to FIG. 3, structural summary 301 shows hierarchy of types 302, with A0Type being the base type, A1Type as a subtype of A0Type, and A3Type as a subtype of A1Type. A1Type has elements A0 and A3 of A0Type and A3Type, respectively.

Because of substitution, the A0 may be treated as being A1Type instead of A0Type. Accordingly, A1Type includes an element of the type A1Type, thus defining a cyclic construct.

With respect to A3, it also leads to a cyclic construct. A3's type, which is A3Type, is a subtype of A1. Thus, A1Type includes of an element of the same type and defines a cyclic construct.

To detect cyclic constructs brought about by inherency, type declarations of a schema are examined. When a declaration declares a type as including an element of a particular type, the inheritance hierarchy of the element's particular type is examined. If the particular type is within the hierarchy of inheritance of the type to which the element is being added, a cyclic construct is detected. The element is mapped to a database representation for handling cyclic constructs, such as out-of-line storage, as described previously.

According to an embodiment, a modified form of the procedure DETECT CYCLES may be used to detect cycles arising from inheritance. At step 210, an additional check is performed. In addition to determining whether the "current declaration" declares a type, element, or element of a type that is on the stack, it is also determined whether the type of the element is in the hierarchy of inheritance of a type on the stack. Thus, if it is determined that the "current declaration" declares a type, element, or element of a type within the hierarchy of inheritance on the stack, then at step 215, the element is mapped to a database representation for cyclic constructs, such as an out-of-line table.

Complex Cyclic Constructs

Complex cyclic constructs can arise as a result of inclusion and inheritance in conjunction with multiple type declarations within a XML schema. For example, consider the following XML schema C.

| XML Schema C |
|---|
| <schema> |
| <complexType name="A"> |
| <complexContent> |
| <extension base="D"> |
| <sequence> |
|    <element name="B0" type="B"> |
| </sequence> |
| </extension> |
| </complexContent> |
| </complexType> |
| <complexType name="C"> |
| <complexContent> |
| <extension base="B"> |
| <sequence> |
|    <element name="D0" type="D"> |
| </sequence> |
| </extension> |
| </complexContent> |
| </complexType> |

In XML schema C, C is a subtype of B and A is a subtype of D. C contains an element D0 of type D and A contains an element B0 of type B. This results in a cyclic construct because a type B element can be substituted by a type C element, which contains a type D element, which in turn can be substituted by a type A element, which contains a type B element, thus completing the cycle.

Such cyclic constructs can be detected by generating a directed dependency graph with graph nodes interconnected by directed edges. A graph node corresponds to either a type or element. A type X that has a subtype Y is represented by a node for X that has a directed edge to a node for Y. A type or element X that contains an element Y is represented by a node for X that has a directed edge to a node for Y. An element X being of a type Y is represented by a node for X that has a directed edge to a node for Y. The cyclic construct is detected when a cycle is detected in the subgraph.

Figure 4:
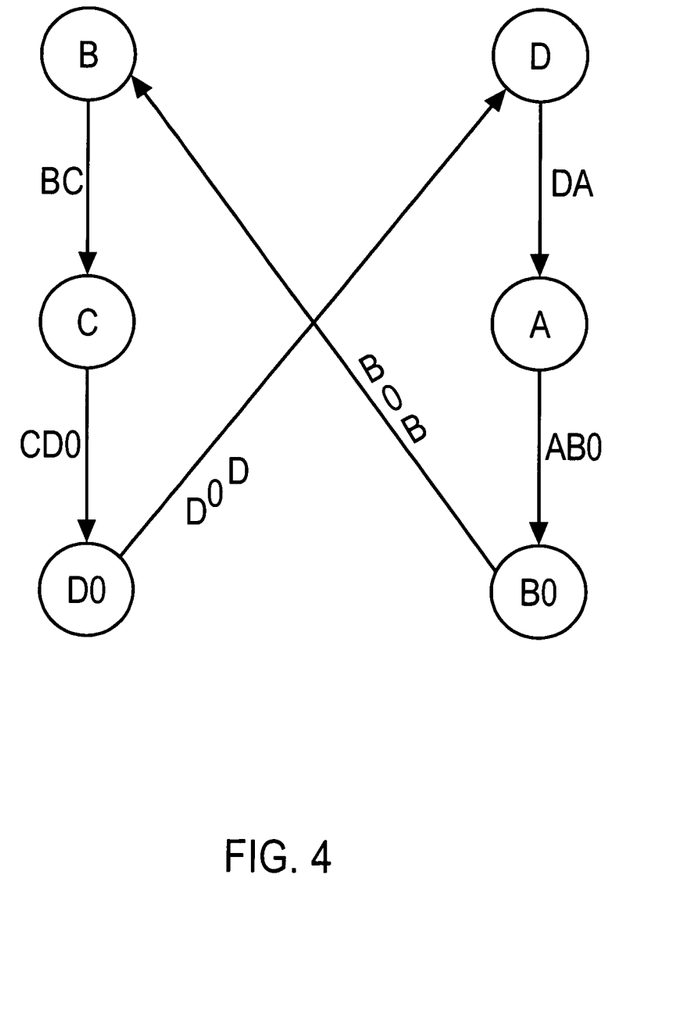
FIG. 4 is a dependency graph generated for types defined by a XML schema according to an embodiment of the present invention.

Detecting cyclic constructs using such a dependency graph is illustrated with respect to dependency graph 401 depicted in FIG. 4. Dependency graph 401 is a directed dependency graph for XML schema C. Graph nodes B, C, D, A represent types B, C, D, A, respectively. Graph nodes D0 and B0 represent elements D0 and B0, respectively. Edge BC, going from node B to C, represents that type C is a subtype of type B; edge DA, going from node D to node A, represents that type A is a subtype of type D. Edge CD0, going from node C to node D0, represents that type C contains element D0; edge AB0, going from node A to B0, represents that type A contains element B0. Edge D0D, going from node D0 to D, represents that element D0 belongs to type D; edge B0B, going from node B0 to B, represents that element B0 belongs to type B.

Analysis of the dependency graph reveals a cycle. The cycle consists of edges BC, CD0, D0D, DA, AB0, and B0B. The cyclic construct may be represented by mapping element D and element B to out-of-line tables.

Hardware Overview

Figure 5:
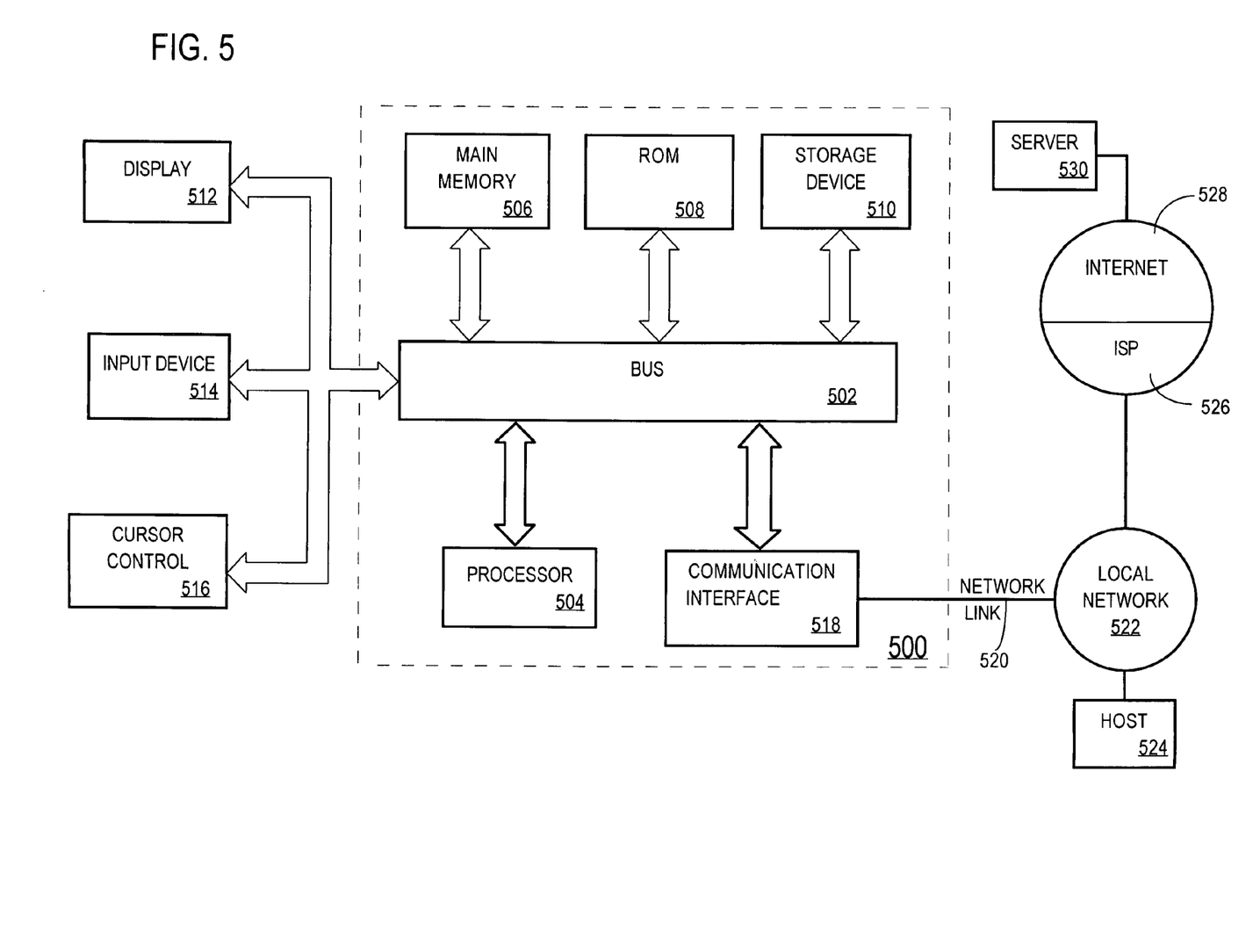
FIG. 5 is a diagram of a computer system used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising
a database server registering a XML schema, wherein registering the XML schema includes:
traversing a declaration of a first element that comprises a second element;
while traversing said declaration of said first element:
tracking on a stack a declaration of an element or a type encountered during said traversing;
encountering said second element; and
determining that said second element belongs to a type within a hierarchy of inheritance of a certain type of said first element by at least determining that said first element is on the stack; and
in response to determining that said second element belongs to a type within a hierarchy of inheritance of a certain type of the first element, performing:
determining that said XML schema defines a cyclic construct;
determining a database representation capable of storing instances of said XML schema that contain said cyclic construct; and
generating a mapping between constructs of said XML schema and said database representation.

2. The method of claim 1, wherein said registering a XML schema includes adding, within said XML schema, annotations that describe one or more properties of said database representation.

3. The method of claim 1, wherein:
determining that said XML schema defines a cyclic construct includes detecting that an ascendant element and a descendant element that descends from the ascendant element are involved in said cyclic construct;
the database representation includes an out-of-line table for storing said ascendant element; and
generating a mapping includes generating a mapping that maps said ascendant element to said out-of-line table.

4. The method of claim 3, wherein registering a XML schema includes adding within said XML schema an annotation that describes said out-of-line table.

5. The method of claim 3, wherein:
said descendant element and said ascendant element are mapped to an object type;
said out-of-line table is defined by said database server to store objects of said object type; and
said object type defines a reference for referring to an object within said out-of-line table.

6. The method of claim 1, wherein the second element is an ascendant of the first element.

7. The method of claim 1, wherein the first element and the second element are of a same type.

8. The method of claim 1, wherein determining that said XML schema defines a cyclic construct includes:
generating a dependency graph based on a declaration of one or more elements or types; and
detecting that said dependency graph includes a cycle.

9. A method, comprising
a database server registering a XML schema, wherein registering the XML schema includes:
traversing a declaration of a type of a first element that comprises a second element:
while traversing said declaration of said type of said first element:
tracking on a stack a declaration of an element or a type encountered during said traversing;
encountering said second element; and
determining that said second element belongs to a type within a hierarchy of inheritance of a certain type of the first element by at least determining that said certain type of said first element is on the stack; and
in response to determining that said second element belongs to a type within a hierarchy of inheritance of a certain type of the first element, performing:
determining that said XML schema defines a cyclic construct;
determining a database representation capable of storing instances of said XML schema that contain said cyclic construct; and
generating a mapping between constructs of said XML schema and said database representation.

10. A volatile or non-volatile computer-readable medium storing one or more sequences of instructions which, when executed by one or more processors, causes the one or more processors to perform
a database server registering a XML schema, wherein registering the XML schema includes:
traversing a declaration of a first element that comprises a second element;
while traversing said declaration of said first element:
tracking on a stack a declaration of an element or a type encountered during said traversing;
encountering said second element; and
determining that said second element belongs to a type within a hierarchy of inheritance of a certain type of said first element by at least determining that said first element is on the stack; and
in response to determining that said second element belongs to a type within a hierarchy of inheritance of a certain type of the first element, performing:
determining that said XML schema defines a cyclic construct;
determining a database representation capable of storing instances of said XML schema that contain said cyclic construct; and
generating a mapping between constructs of said XML schema and said database representation.

11. The medium of claim 10, wherein said registering a XML schema includes adding, within said XML schema, annotations that describe one or more properties of said database representation.

12. The medium of claim 10, wherein:
determining that said XML schema defines a cyclic construct includes detecting that an ascendant element and a descendant element that descends from the ascendant element are involved in said cyclic construct;
the database representation includes an out-of-line table for storing said ascendant element; and
generating a mapping includes generating a mapping that maps said ascendant element to said out-of-line table.

13. The medium of claim 12, wherein registering a XML schema includes adding within said XML schema an annotation that describes said out-of-line table.

14. The medium of claim 12, wherein:
said descendant element and said ascendant element are mapped to an object type;
said out-of-line table is defined by said database server to store objects of said object type; and
said object type defines a reference for referring to an object within said out-of-line table.

15. The medium of claim 10, wherein the second element is an ascendant of the first element.

16. The medium of claim 10, wherein the first element and the second element are of a same type.

17. The medium of claim 10, wherein determining that said XML schema defines a cyclic construct includes:
generating a dependency graph based on a declaration of one or more elements or types; and
detecting that said dependency graph includes a cycle.

18. A volatile or non-volatile computer-readable medium storing one or more sequences of instructions which, when executed by one or more processors, causes the one or more processors to perform
a database server registering a XML schema, wherein registering the XML schema includes:
traversing a declaration of a type of a first element that comprises a second element:
while traversing said declaration of said type of said first element:
tracking on a stack a declaration of an element or a type encountered during said traversing;
encountering said second element; and
determining that said second element belongs to a type within a hierarchy of inheritance of a certain type of the first element by at least determining that said certain type of said first element is on the stack; and
in response to determining that said second element belongs to a type within a hierarchy of inheritance of a certain type of the first element, performing:
determining that said XML schema defines a cyclic construct;
determining a database representation capable of storing instances of said XML schema that contain said cyclic construct; and
generating a mapping between constructs of said XML schema and said database representation.

* * * * *

UNITED STATES PATENT AND TRADEMARK OFFICE
CERTIFICATE OF CORRECTION

PATENT NO. : 8,554,789 B2  
APPLICATION NO. : 11/246001  
DATED : October 8, 2013  
INVENTOR(S) : Agrawal et al.

Page 1 of 1

It is certified that error appears in the above-identified patent and that said Letters Patent is hereby corrected as shown below:

On Title page 2, column 2, under Other Publications, line 9, delete "Documnts" and insert -- Documents --, therefor.

On Title page 3, column 2, under Other Publications, line 10, delete "7 pages." and insert -- received Aug. 21, 2008, 7 pages. --, therefor.

In the Drawings

On sheet 3 of 5, in figure 3, line 5, delete "A0 AOTYPE" and insert -- A0 A0TYPE --, therefor.

In the Specification

In column 3, line 2, delete "statements)" and insert -- statements). --, therefor.

In column 10, line 28, delete "modern" and insert -- modem --, therefor.

In the Claims

In column 11, line 31, in Claim 1, delete "element:" and insert -- element; --, therefor.

In column 12, line 19, in Claim 9, delete "element:" and insert -- element; --, therefor.

In column 12, line 21, in Claim 9, delete "element:" and insert -- element; --, therefor.

In column 12, line 49, in Claim 10, delete "element:" and insert -- element; --, therefor.

In column 14, line 9, in Claim 18, delete "element:" and insert -- element; --, therefor.

In column 14, line 11, in Claim 18, delete "element:" and insert -- element; --, therefor.

Signed and Sealed this  
Eighteenth Day of February, 2014

Michelle K. Lee  
*Deputy Director of the United States Patent and Trademark Office*